(12) United States Patent
Salla et al.

(10) Patent No.: US 11,892,614 B2
(45) Date of Patent: Feb. 6, 2024

(54) LIGHT SOURCE DEVICE

(71) Applicant: FUNDACIO INSTITUT DE CIENCIES FOTONIQUES, Barcelona (ES)

(72) Inventors: Jordi Andilla Salla, Barcelona (ES); Pablo Loza-Alvarez, Barcelona (ES); Rodrigo Itzamna Becerra Deana, Barcelona (ES)

(73) Assignee: FUNDACIO INSTITUT DE CIENCIES FOTONIQUES, Barcelona (ES)

( * ) Notice: Subject to any disclaimer, the term of this patent is extended or adjusted under 35 U.S.C. 154(b) by 203 days.

(21) Appl. No.: 16/922,966

(22) Filed: Jul. 7, 2020

(65) Prior Publication Data

US 2021/0018737 A1    Jan. 21, 2021

(30) Foreign Application Priority Data

Jul. 15, 2019  (EP) ..................................... 19382596

(51) Int. Cl.
| | |
|---|---|
| *G02B 21/08* | (2006.01) |
| *F21V 5/04* | (2006.01) |
| *F21V 8/00* | (2006.01) |
| *G02B 21/36* | (2006.01) |
| *F21Y 115/10* | (2016.01) |
| *G02B 27/30* | (2006.01) |

(52) U.S. Cl.
CPC ............ *G02B 21/086* (2013.01); *F21V 5/043* (2013.01); *G02B 6/0006* (2013.01); *G02B 6/0008* (2013.01); *G02B 21/367* (2013.01); *F21Y 2115/10* (2016.08); *G02B 27/30* (2013.01)

(58) Field of Classification Search
CPC .... G02B 27/30; G02B 6/0006; G02B 6/0008; G02B 21/086; G02B 21/367; F21V 5/043
See application file for complete search history.

(56) References Cited

U.S. PATENT DOCUMENTS

| | | | | |
|---|---|---|---|---|
| 4,730,895 | A | * | 3/1988 | Siedband ............. G02B 6/0008 385/121 |
| 4,952,022 | A | * | 8/1990 | Genovese ............ G02B 6/0008 355/1 |
| 4,974,927 | A | * | 12/1990 | Kimura ................ H04N 1/0311 385/115 |

(Continued)

OTHER PUBLICATIONS

Axelrod, D., "Cell-Substrate Contacts Illuminated by Total Internal Reflection Fluorescence," The Journal of Cell Biology, vol. 89, No. 1, Apr. 1981, 5 pages.

(Continued)

*Primary Examiner* — Arman B Fallahkhair
(74) *Attorney, Agent, or Firm* — McCoy Russell LLP

(57) ABSTRACT

Light source device comprising a light source and an optical component, wherein the optical component comprises a receiving section for receiving light from the light source and an emitting section for emitting light, wherein the light source is a non-coherent light source and is adapted to emit light from a two-dimensional region and wherein the optical component is adapted to guide the light from the receiving section to the emitting section such that the light can be emitted in a one dimensional pattern at the emitting section.

14 Claims, 3 Drawing Sheets

(56) References Cited

U.S. PATENT DOCUMENTS

| | | | | |
|---|---|---|---|---|
| 5,129,021 A | * | 7/1992 | Mortimore | G02B 6/2856 |
| | | | | 385/46 |
| 5,570,442 A | * | 10/1996 | Arii | G02B 6/1221 |
| | | | | 385/14 |
| 5,838,853 A | * | 11/1998 | Jinnai | G02B 6/125 |
| | | | | 385/48 |
| 7,693,367 B2 | * | 4/2010 | Nakai | G02B 6/2835 |
| | | | | 385/28 |
| 9,810,896 B2 | * | 11/2017 | Nishiwaki | H04N 13/239 |
| 10,989,661 B2 | * | 4/2021 | Fiolka | G02B 21/0032 |
| 2007/0070302 A1 | * | 3/2007 | Govorkov | G02B 26/0808 |
| | | | | 348/E9.026 |

OTHER PUBLICATIONS

Tokunaga, M. et al., "Highly inclined thin illumination enables clear single-molecule imaging cells," Nature Methods, vol. 5, No. 2, Feb. 2008, Available Online Jan. 6, 2008, 3 pages.

Birks, T. et al., "The Photonic Lantern," Advances in Optics and Photonics, vol. 7. No. 2, Apr. 13, 2015, 46 pages.

\* cited by examiner

LIGHT SOURCE DEVICE

CROSS-REFERENCE TO RELATED APPLICATION

The present application claims priority to European Patent Application No. 19 382 596.5 filed on Jul. 15, 2019. The entire contents of the above-listed application is hereby incorporated by reference for all purposes.

TECHNICAL FIELD

The present invention refers to a light source device, an optical device comprising the light source device, and a light sheet microscope comprising an optical sensor and the optical device.

BACKGROUND AND SUMMARY

In the field of biological microscopy, wide field and confocal microscopy are the most commonly known and applied techniques. Wide field microscopy illuminates the whole sample and uses an optical sensor like a camera to acquire the signal. Confocal microscopy uses a beam to scan the sample and detects the emitted signal using a single detector while scanning. Using a pinhole in the imaging plane, confocal microscopes provide 3D optical sectioning. This allows imaging of 3D samples by imaging them plane by plane.

Light sheet microscopy has become a very important tool in biological microscopy allowing wide-field detection while having 3D optical sectioning. The light sheet microscopy, also named Selective Plane Illumination Microscopy (SPIM), generally comprises emitting a light of a specific frequency in the form of a sheet into a target entity like a cell or plurality of cells like tissues, organs or model organisms. The observing entity, such as an optical sensor, is typically positioned in a direction perpendicular to the light sheet plane (i.e. has an observation direction that is external to the plane of the light sheet) and can view the light emitted from the target entity when the light sheet passes through this entity. By moving the target entity relative to the light sheet, it is possible to observe the entity plane by plane. Using light sheet microscopy, therefore, allows for 3D imaging of biological processes.

For performing light sheet microscopy, it is necessary that the light sheet has a comparably small thickness (in the region of a few micrometers) and illumination uniformity. At present, monochromatic light sources in the form of lasers are used to create light sheets. These lasers provide both spatial and temporal coherence. In this context, point sources like the above-mentioned lasers are considered to be sources that essentially have no extension, which may be called to have a dimension of zero, thereby realizing a spatially coherent source of light. It is clear that also the region from which a laser emits laser light is not of zero dimension or no extension but has a very small extension. This extension, however, is significantly smaller than what will be considered in the following as "extended sources". Such sources are, for example, LEDs and other lamps that emit their light (for example also monochromatic light) from a region having usually extension in at least two dimensions. The "extended sources" thus have spatial extension and are thus spatially non-coherent sources.

However, for performing light sheet microscopy, it is only necessary to generate a light sheet having small thickness and not necessarily requiring coherence. Therefore, for generating a light sheet, a source having an extension in only one dimension is needed. Furthermore, though the light sheet microscopy when using fluorescence emission is preferably performed using monochromatic sources like lasers, absolute monochromaticity is usually not necessary.

Unfortunately, there are currently no other monochromatic light sources available that can generate a sufficiently small (in terms of the thickness of the light sheet) light sheet and that allow for high quality light sheet microscopy. Further, laser systems are quite expensive.

Provided herein is a light source device and system that can be used in light sheet microscopy or other sorts of specific illumination patterns. In some aspects, the disclosed light source device may be cheaper to produce and/or easier to handle than commonly known systems.

The light source device according to the invention comprises a light source and an optical component, wherein the optical component comprises a receiving section for receiving light from the light source and an emitting section for emitting light, wherein the light source is a non-coherent light source and is adapted to emit light from a two-dimensional region and wherein the optical component is adapted to guide the light from the receiving section to the emitting section such that the light can be emitted in a one dimensional pattern at the emitting section. Specifically, the emitted light may be spatially coherent in one dimension, for example when the pattern is a straight line.

In the context of the present invention, emitting light from a two-dimensional region means that the light is emitted from a plane, like a circle, a rectangle or any other shape. The two-dimensional region does not necessarily need to be a "plane" surface but it can also be a curved surface like the surface of a sphere. Basically, the two-dimensional region from which the light is emitted by the light source is an arbitrary region having arbitrary shape but with the requirement that any point in this two-dimensional region from which the light is emitted can be described by using two parameters. For example, assuming a coordinate system having Cartesian coordinates x and y, and further assuming that the two-dimensional region is a square, any point within this square can be specified by using the two "parameters" x and y as coordinates for each point within this two-dimensional region. In the case where the two-dimensional region emitting the light is the surface of a sphere, the two parameters will be the angles $\vartheta$ and $\varphi$ as commonly used in describing spherical coordinates. Other examples can be imagined by those of ordinary skill in the art.

In contrast to this, emitting the light from the emitting section in a one dimensional pattern means that the pattern in which the light is emitted is considered a point source in one dimension and has an extension in the other dimension. This means that the emitting section will emit the light as a plurality of dots in a one dimensional pattern where this one dimensional pattern is a pattern that comprises points and can be specified by using exactly one parameter. Due to the lateral point spread function (PSF) of optical systems, it is not possible to create a "one-dimensional" object or emitting section. However, in the following, a one-dimensional emitting section will be considered a region where the extension of this emitting section in the one dimension intended will be much larger ($10^2$ or $10^4$ or $10^6$) than the size of the lateral PSF of the system.

By the term "guiding the light from the receiving section to the emitting section", it is meant that the light introduced into the receiving section travels a given distance through the optical component to the emitting section. It is intended that the "amount of light" introduced into the receiving section of the optical component will completely or at least almost completely (with losses of less than 2%, preferably less than 1%, most preferred less than 0.5%) reach the emitting section and will be emitted at the emitting section.

With the light source device as described herein, simple and cheap light sources that emit non-coherent but monochromatic light, like LEDs, can be used for creating a one-dimensionally coherent light that can potentially further be used, for example, for generating a light sheet for light sheet microscopy. Laser light, as used in conventional systems, has spatial and temporal coherence. However, for generating a light sheet, it has been found in accordance with the invention, that spatial coherence is only necessary in one dimension and temporal coherence is not even needed at all. By dropping these requirements, the application of a laser is no longer necessary and cheaper sources can be used as long as spatial coherence in at least one dimension is (almost or at least to same degree) obtained. By providing the light source device according to the disclosed embodiments, this spatial coherence is created by reducing the dimensionality of the region from which the light is emitted at the emitting section compared to the dimensionality of the light emitting region at the light source.

It is clear that no perfect spatial coherence can be obtained with this light source device as this would violate the second law of thermodynamics. However, with the respective rearrangement of the light by guiding it through the optical component, almost spatial coherence in one dimension can be obtained because the emitting section has a comparably small extension in a plane comprising the one-dimensional pattern and being perpendicular to the emitting direction of the emitting section.

With this light source device, a cheap source for light suitable for performing, for example, light sheet microscopy can be obtained. For example, the light source may be a LED or other extended light sources like an arc lamp. Light emitting diodes provide monochromatic light which is most suitable for light sheet microscopy. Additionally, those LEDs are comparably cheap and can thus reduce the costs of the light source device compared to, for example, using a laser source. Furthermore, the emitting section may be shaped to emit light in the form of at least one of a straight line, a contour of a circle, a contour of a triangle, a contour of a rectangle, an irregular line.

In regard to this embodiment, the term "a contour of" always means the boundary section of the geometric form, for example the circle, the triangle and the rectangle. Those contours refer, therefore, to objects where the coordinates of each point of these objects can be described using a single parameter. For example, for describing a point on the contour of a circle, only one parameter (the polar angle) is necessary.

These embodiments provide realizations of the one-dimensional pattern that can be used efficiently depending on the required application of the light emitted by the emitting section.

In one embodiment, the optical component comprises a plurality of fibers for guiding light, wherein the fibers are tapered at the receiving section and separated at the emitting section. In one example, the optical component may be in the form of a photonic lantern. In this regard, there can be an expanding section between the receiving section and the emitting section where the fibers are still fused together (i.e. tapered) and are only separated after this expanding section. Thereby, this embodiment allows for reducing the losses when the light travels through the optical component.

In one embodiment, the fibers may be single-mode fibers. Single-mode fibers provide a small diameter of the output, thereby reducing the extension of the emitting section in a dimension perpendicular to the one dimensional emission pattern and perpendicular to the emission direction of the light emitted from the emitting section.

Alternatively the fibers may be multi-mode fibers. Multimode fibers are comparably cheap and fewer fibers need to be used for the optical component in order to obtain as many modes as possible from the light emitted by the light source for further use. This comes with the disadvantage that the expansion of the multimode fibers in a plane comprising the one-dimensional emission pattern and being perpendicular to the emission direction of the light emitted from the emitting section being comparably large. However, when using a suitable optic for focusing the light emitted by the light emitting section, this light can nevertheless be applicable, for example, in the context of a light sheet microscope.

In a further embodiment, the tapered section fulfills an adiabatic expansion. This means that the shape of the incident light (specifically the region of the phase space of the incident light at the receiving section) is changed in an adiabatic manner, thus without losing (a significant amount of) energy due to strong condition changes. This can be achieved by, for example, elongating the tapered section to the adiabatic condition without changing the form of the cross-section. Consider for example a fused or a tapered section of the fibers at the receiving section having the shape of a circle. Due to the adiabatic expansion, this circle may not be changed in shape (for example to an elliptical shape) but only its diameter may be increased slowly. In the case of having the same number of single mode fibers as there are spatial modes in the light source, every mode will be slowly guided to each fiber, minimizing the losses during transmission.

In some aspects, a first imaging system may be arranged between the light source and the receiving section for imaging light emitted from the light source to the receiving section of the optical component. With this, for example, differences between the size of the emitting region of the light source and the receiving section in the optical component can be compensated for.

In a further embodiment, the light source comprises a plurality of LEDs and the light source device further comprises a second imaging system for imaging light emitted from the LEDs into the receiving section. With this, coupling the light of a plurality of LEDs (for example also with differently colored LEDs) into the same optical component is possible, thereby reducing the costs of systems using multiple monochromatic light sources.

In one embodiment, the optical component comprises a photonic lantern. This device can now be manufactured at comparably low cost while it can guide the light efficiently in the manner intended according to the embodiments described herein, thereby realizing a light source device that can provide light, for example for application in light sheet microscopy, with reduced costs compared for example to using lasers.

The optical device as described herein comprises a light source device according to any of the above embodiments and an optical system arranged in propagation direction of the light after the emitting section, wherein the optical system is adapted to collimate and/or focus emitted light.

With this optical device, modifying the light emitted by the light source device for further applications is possible. In one embodiment the optical system is adapted to create a light sheet or a set of parallel light sheets from emitted light. Among all potential applications for the light emitted by the light source device according to the invention, the manipulation of the lights such that it provides the form of a light sheet is most preferable.

The light sheet fluorescence microscope according to the invention may comprise an optical sensor having an observation direction and an optical device according to the previous embodiments, wherein the optical sensor and the optical device are arranged relative to each other such that the observation direction is in the plane perpendicular to the light sheet and this plane contains the propagation direction of the light sheet, and an angle between the propagation direction and the observation direction is greater than zero.

With this light sheet microscope, a less expensive yet sufficiently efficient light sheet and a 3D imaging of samples can be achieved.

DETAILED DESCRIPTION

Figure 1:
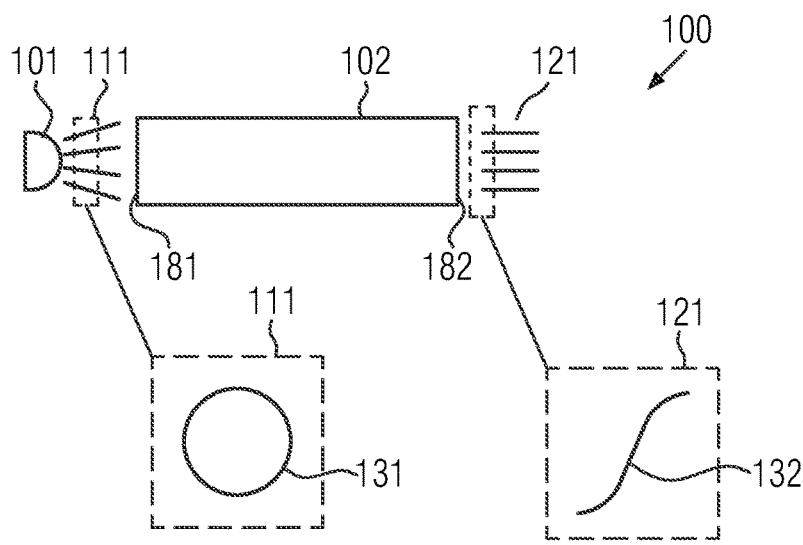
FIG. 1 shows a schematic depiction of a light source device according to one embodiment.

FIG. 1 shows one embodiment of a light source device 100 according to the invention. The light source device comprises a light source 101 and an optical component 102. The light source 101 and the optical component 102 are arranged in a manner that light emitted from the light source will incite on the optical component and will then travel through the optical component such that it can be emitted.

For the further explanations, the portion of the optical component that receives the light from the light source 101 will be named a receiving section 181. The portion of the optical component 102 that will emit light 121 will be called an emitting section 182.

In accordance with the invention, the light source 101 emits light 111. This light, as depicted in FIG. 1, will then hit the receiving section 181. As will be explained later, the light emitted can also be firstly provided through an imaging system that, for example, focuses the light emitted from the light source 101 to the exact shape of the receiving section 181.

The light source 101 is a non-coherent or incoherent light source, like for example a light-emitting diode (LED). Such LEDs are commonly known and any LED, specifically any LED with an arbitrary output energy and an arbitrary frequency can be used with the invention. As will be explained later, it is also possible to use a plurality of LEDs (or other non-coherent sources like arc lamps) as "light source 101".

For ease of description, reference will now be made to only "one" light source 101 though it is understood that light source 101 may include a plurality of lights. The light source 101 will emit light from a two-dimensional region. Considering, for example, an LED, this might be a two-dimensional region in the shape of a circle or square. Without loss of generality, a circular region 131 as depicted in this cross section 111 will be considered as the two-dimensional region emitting light from the light source, for example, in the case of an LED. This two-dimensional region comprises a plurality of points emitting the light. This two-dimensional region and the points within can thus be characterized by two parameters when specifying their position in a coordinate system. Considering for example, the region would be a perfect plane, polar coordinates using the radius (i.e. the distance from an arbitrary point within the region 131 to the center of the region) and the polar angle $\varphi$ can be used as parameters for specifying the coordinates of any point within this region 131. The region does, however, not need to be a perfect plane. In fact, the coordinates of points within an arbitrary shaped and curved two-dimensional region can be specified using a function depending on only two parameters.

In any case, light emitted from the light source and specifically from the two-dimensional region of the light source incites on the receiving section 181 of the optical component. Within this optical component 102, a rearrangement of the propagation direction occurs in a manner that preferably all light (i.e. without energy losses) is guided from the receiving section to the emitting section 182. However, at the emitting section the light is emitted in a different shape 132 as depicted in the cross section 121. This shape 132 is, however, in contrast to the two-dimensional region with which the light is emitted at the light source 101, a one-dimensional pattern. In contrast to the two-dimensional region 131, the one-dimensional pattern comprises a plurality of points where the coordinates of these points can be specified using exactly one parameter. The dimensionality of the pattern with which the light is emitted from the optical component at the emitting section 182 is thus reduced by one compared to the two-dimensional region at which the light is emitted at the light source.

This reduction in dimensionality is, preferably, achieved without losing any energy on the way from the light source to the emitting region. However, in view of physical constraints and manufacturing issues (as will be apparent later), there can indeed be some loss so that the efficiency of transferring the light emitted from the light source 101 via the optical component will be less than 100%. However, in accordance with the invention, the efficiency can be comparably high, for example 98% or even more.

The one-dimensional pattern 132 with which the emitting section will output light is not perfectly one-dimensional. This is because any object that emits light in the real world has an extension in at least two dimensions. Consider for example the exiting region of an optical fiber. This has a specific diameter, for example in the range of a few micro meters. However, it is intended that the "one-dimensional pattern" at which the light is emitted from the emitting section has an extension L along this one-dimensional pattern that is much larger compared to the extension perpendicular to this one-dimensional pattern. The length of the one-dimensional pattern is shown in FIG. 1 as 132, i.e. as the curved line. The extension in a dimension perpendicular to the direction along the line may thus be much smaller than the extension of the line, for example $10^{-2}L$ or $10^{-4}L$ or $10^{-6}L$. Under such circumstances, the emission pattern can be considered a "one-dimensional" pattern although this, of course, does not happen in reality and the emission pattern is rather two-dimensional. However, the extension of the pattern of light emitted from the emitting section in the second dimension is much smaller compared to the corresponding extension of the two-dimensional region with which light is emitted at the light source.

Figure 2:
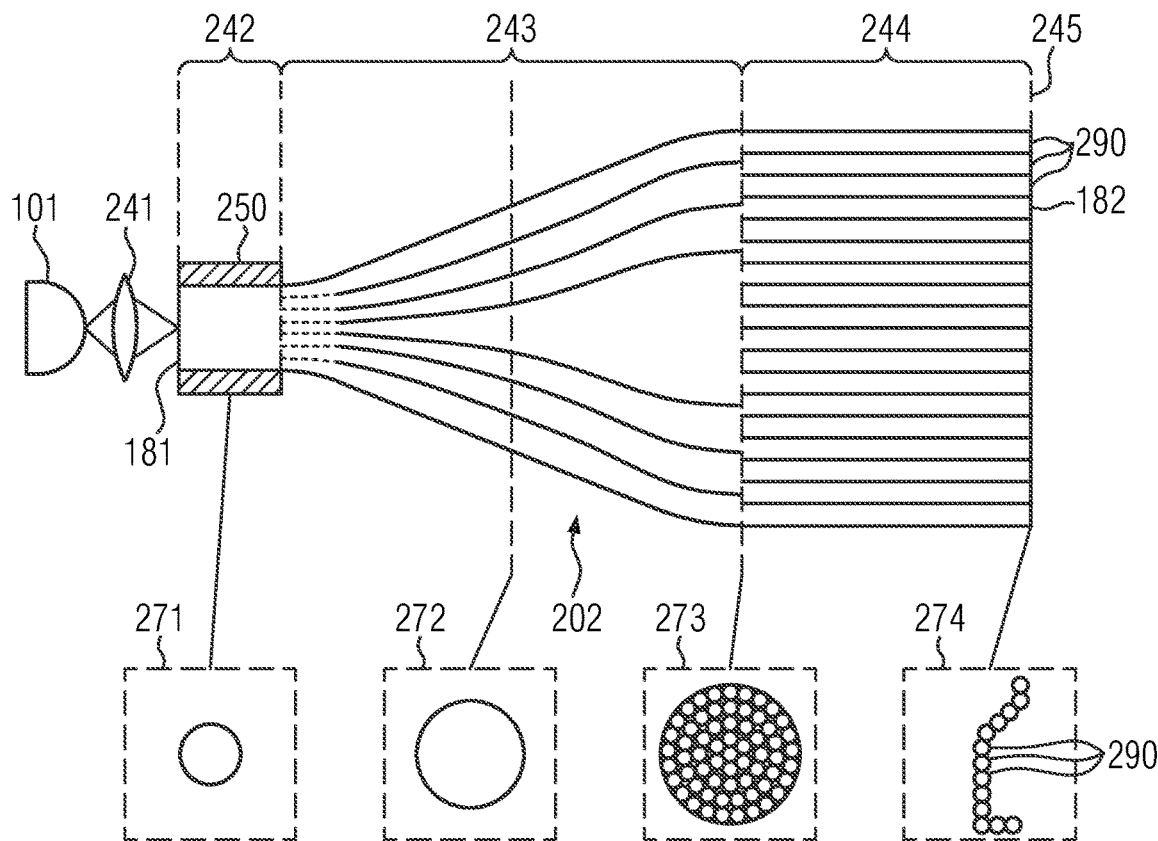
FIG. 2 shows a more detailed depiction of an optical component in the form of a photonic lantern according to one embodiment.

FIG. 2 shows one example of an optical component with which such modifications to the pattern at which light is emitted can be achieved. This embodiment in FIG. 2 makes use of a so-called "photonic lantern" as is, for example, described in the paper "The Photonic Lantern" by Birks et al in Advances in Optics and Photonics, volume 7, issue two, page 107 (2015), DOI: 10.1364/AOP.7.000107, the contents of which are incorporated by reference herein in their entirety. Such a photonic lantern is obtained by adiabatically merging several single mode fibers (or multimode fibers) into one multimode core, whereby a low loss interface between a single mode and multimode system can be obtained.

A photonic lantern is depicted in FIG. 2 as item 202 whereas the light source is depicted as item 101.

As previously explained, it is possible to position a first imaging system 241 in propagation direction of the light emitted from the light source 101 between the light source 101 and the photonic lantern 202. To describe the shape and functionality of the photonic lantern in FIG. 2 in more detail, cross sections of the photonic lantern in a plane perpendicular to the general propagation direction of light travelling through the photonic lantern will be provided and explained.

The first imaging system 241 may be provided in order to image the light emitted from the light source 101 from the light source to the receiving section of the optical component. This may result in a change of, for example, the opening angle at which the light emitted from the light source 101 previously traveled. Using, for example, a collimating lens, the light emitted from the light source 101 under a specific angle may be transformed to almost parallel light beams that incite on the receiving section 181 of the photonic lantern 202.

In view of this, the cross-section of the receiving section 181 and a first portion of the photonic lantern is denoted with 271. This cross-section may advantageously be provided in the form of a circle. The diameter of the circle is (almost) constant over the first portion 242. Furthermore, this first portion 242 may be surrounded by a cladding/coating 250 or other medium having a lower index of refraction than the material in the first portion. Thus, light incident on the receiving section 181 will just be guided through the portion 242 as it would be guided by a normal multimode fiber. Preferably, the cross-section 271 of the first portion 242 is chosen such that (almost) all incident modes arriving at the receiving section will be able to travel through this first region 242. In some aspects, at least 99% of the incident modes will be able to travel through this region.

In the propagation direction of the light through the optical component from the receiving section to the emitting section 182, there is provided a tapered section (which may also be called a guiding section) 243 after the first portion 242. In this tapered section, the diameter of the cross-section of the photonic lantern is increased in the way that there is possible an adiabatic expansion and thus a smooth guidance of the light modes travelling through the photonic lantern. Through this adiabatic expansion, every mode of the incident light is guided to a single mode fiber without losing energy at this point. In the tapered section 243, the "multimode core" is smoothly transformed to a bundle of single mode cores.

At the end of the tapered section 243, there is a section 244 where now all the fibers are separated and independent. This comes from the manufacturing process with which the photonic lantern is manufactured. This is achieved by melting a portion of a bundle of fibers (for example single mode fibers or multimode fibers) together at one point and increasing the length in a specific portion such that its diameter is reduced. Thereby, the shape of the regions 242 and 243 is obtained.

At the point of transition between the portions 243 and 244, the cross-section of the bundle of fibers is shown in 273. It is still of circular shape where, instead of a single core, there is now a plurality of fibers. In some aspects, all modes that traveled through the tapered region 243 will now travel through the fibers 244. However, some losses may occur here at this transition point.

Once the modes are coupled into the fibers 290 (denoting only three examples of the overall amount of fibers), they travel as separate light modes. When following the propagation direction of light through the portion 244, the relative arrangement of the optical fibers may be changed arbitrarily without this having any influence on the modes guided through the separate fibers and without this having influence on other fibers. Thus, the guides/fibers can be rearranged such that, at the emitting section 245, the arrangement has the shape of the cross-section 274 (in the form of an arbitrary curved one-dimensional pattern).

By applying this specific optical component (in this case in the form of a photonic lantern), it is thus possible to reduce the dimensionality and the arrangement of the light emitted from the light source 101 from two dimensions to efficiently one dimension at the emitting section 182 without losing energy as all modes incident on the receiving section 181 can, in theory, travel through the photonic lantern. However, due to some constraints of physical and manufacturing nature, there will be some losses. Those losses, however, can be kept comparably small.

In order to explain the physical concept of this optical component in the form of a photonic lantern, one may imagine the following exemplary situation. An extended light source can be decomposed into multiple point-sources distributed along its two dimensions. This decomposition may also be referred to as separating the emitted light into its constituting modes. The fused (tapered) section acts as a multimode fiber allowing the guidance of the multiple modes of the light source. In the adiabatic expansion section, the modes are smoothly guided optically to every single mode fiber. If every mode has an associated available single mode fiber, it will be guided (essentially) without losses. The emitting section then consists of the resulting single mode fibers that can be organized in a linear (or other) pattern allowing for the reduction of dimensionality compared to the original light source.

With these explanations, it is clear that, with enough single mode fibers, the application of the photonic lantern to basically reduce the dimensionality of the light pattern emitting light at the emitting section compared to the two-dimensional region of the light source 101 while, at the same time, not losing significant amounts of energy still complies with the second law of thermodynamics.

Figure 3:
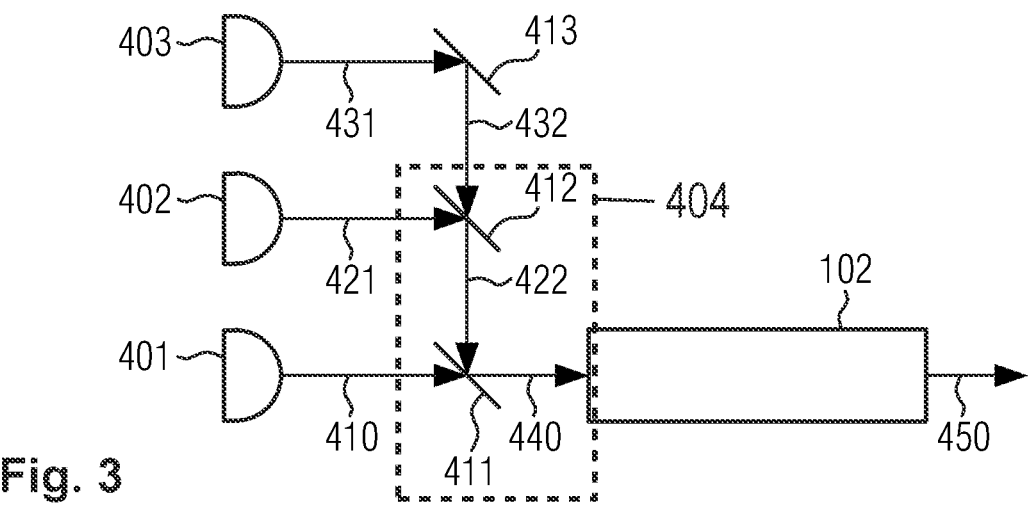
FIG. 3 shows one embodiment where there is provided a plurality of light sources and a single optical component.

FIG. 3 shows a further embodiment where there still is only one optical component 102 as explained previously (for example a photonic lantern) but there is provided a plurality of light sources 401 to 403. Those light sources may, for example, be embodied in the form of differently colored light-emitting diodes (LEDs). In any case, each of the light sources 401 to 403 is provided as a non-coherent light source. While, for ease of explanation, there are only three light sources depicted and referred to in the following, it is clear that it is also possible to use any number of light sources. For example, there may be provided two light sources or 4, 5, 10, 20, 50 light sources instead of the three depicted in FIG. 3. The invention can be applied to any number of light sources as will become apparent from the further explanations below.

In order to introduce the light emitted from each of the light sources into the receiving section (not denoted here) of the optical component 102, a plurality of mirrors or other optical devices may be used for redirecting the beams.

The arrangement in FIG. 3 achieves the respective introduction of the light emitted from all the light sources into the optical component by arranging the light source 401 such that its emitted light 410 directly incites on the receiving section of the optical component 102 (after having passed the dichroic mirror 411).

The light emitted by the light source 402 denoted with 421 firstly hits a dichroic mirror 412 of a second imaging system 404 which reflects the light into the direction 422 such that this light will now hit the dichroic mirror 411 of the second imaging system 404 where it is once again reflected such that the incites together with the light emitted from the light source 401 as light beam 440 on the receiving section of the optical component.

For the third light source 403, a corresponding arrangement is chosen. The light 431 emitted by this light source firstly hits a dichroic mirror 413 from which it is reflected into the direction 432. When travelling along this direction, it hits the dichroic mirror 412 through which it passes and travels along the path 422 in order to hit the dichroic mirror 411 from which it is likewise reflected in order to travel in the direction 440 to the receiving section of the optical component 102, like is the light of the light source 401 and 402.

By this arrangement, it is possible to either combine a plurality of identically colored non-coherent light sources (for example a plurality of LEDs) or to combine a plurality of differently colored light sources (for example a blue, green and red LED). This allows for providing a plurality of applications as the light 450 emitted from the optical component can, for example, comprise a single wavelength only (by using, for example, monochromatic LEDs of the same kind as different light sources) or by providing a multicolored light 450 (by using a plurality of differently colored light sources). The application of such a light source device can be realized depending on the circumstances by simply exchanging the light sources 401 to 403. In order to achieve this, the light sources can be arranged in the light source device in an exchangeable manner without, for example, this requiring the use of additional tools let alone the destruction of the light source device.

Figure 4:
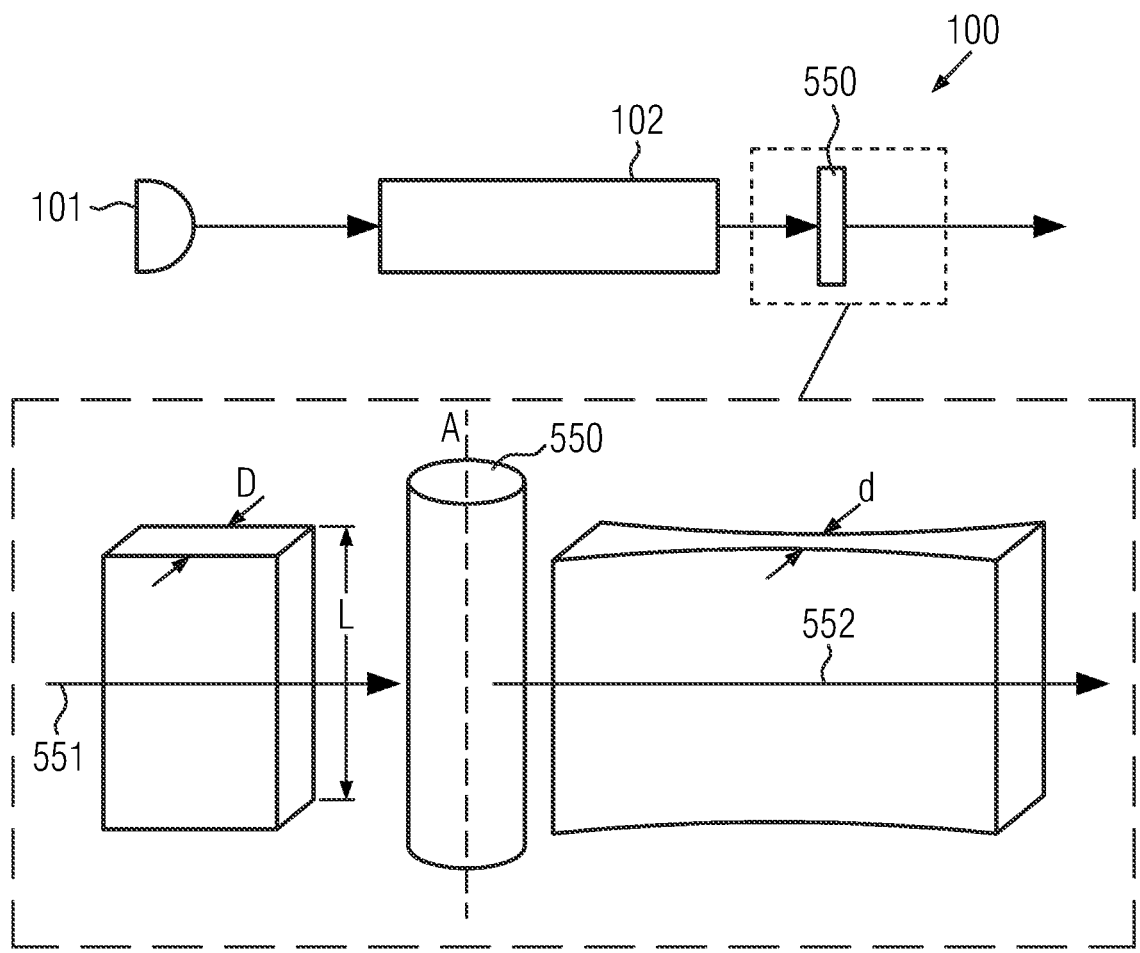
FIG. 4 shows one embodiment of an optical device comprising a light source device and an optical system.

FIG. 4 shows an optical device that comprises a light source device 100 comprising the light source 101 and an optical component 102 in line with the embodiments described with respect to FIGS. 1 to 3.

In addition, there is arranged in the propagation direction of the light emitted from the emitting region an optical system that is preferably adapted to collimate and focus the light emitted from the emitting section of the optical component 102.

The optical system may take a variety of forms and may comprise one or more mirrors, one or more lenses, or any other optical component suitable for collimating/focusing or manipulating the light emitted from the optical component 102 in the manner as intended.

Figure 5:
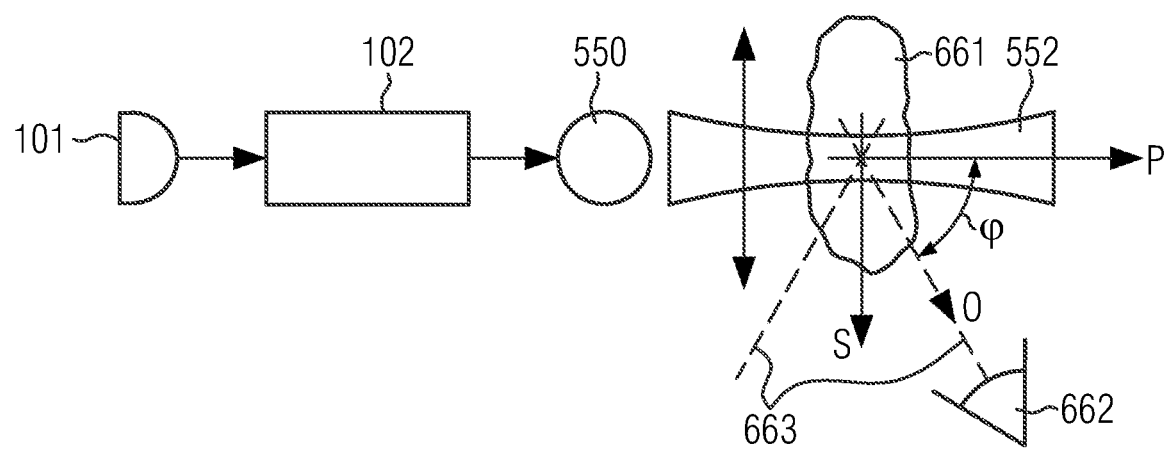
FIG. 5 shows one embodiment of a light sheet fluorescence microscope using the optical device according to the invention.

In FIG. 5, the embodiment is intended to provide, after the light having passed the optical system 550, a light sheet that can be used, for example, for light sheet microscopy.

In order to obtain such a light sheet from the light emitted from the emitting section of the optical component 102, the optical system 550 comprises at least one cylindrical lens (also denoted with 550 here, but further components not shown may form part of the optical system as well) in the embodiment described.

The emitting section of the optical component 102 in FIG. 4 is designed as a straight line which will, thus, result in light 551 being emitted that has the shape of a cuboid with an extension D perpendicular to the propagation direction of this cuboid and perpendicular to the extension L of the emitting section and correspondingly the extension L of the emitted light.

This cuboid stream of light is then introduced into the cylindrical lens 550 such that the extension L is in parallel to the axis of symmetry A of the cylindrical lens. By this arrangement, the light incident on the cylindrical lens is focused such that a light sheet 552 is created having an extension d that is smaller than the extension D before the cuboid shape of the emitted light passes the cylindrical lens.

Such a light sheet may have an extension d of a few micrometers, for example 2 or 5 µm. Such a light sheet can allow for application in light sheet microscopy as, with this, it is possible to pass a sufficiently small light sheet through a sample and, thus, provide for 3-D imaging of the sample using the emitted or scattered light.

A corresponding application of a light sheet is shown in FIG. 5. In FIG. 5, there is shown the arrangement of the light source 101, the optical component 102 and the cylindrical lens 550 as well as the emitted light sheet 552 in a top view. The light sheet 552 is transmitted through a sample 661, for example a plurality of biological cells. The observation direction O depicted as dashed line is in the plane defined by the direction of the propagation P of the illumination and the direction S orthogonal to the light sheet. The observation direction further has an angle φ with P where φ>0. For example, φ may be 45°, 90° or 135°. Along this observation direction O, there is positioned an optical sensor for receiving and recognizing light emitted from the target 661. As the light emitted from the light source 101 is preferably a monochromatic light (for example green light by using a green LED), using optical sensors that are specifically sensitive to the light emitted by the light source is preferable because, with this, a significant contrast can be obtained.

When the light sheet 552 travels through the target 661, light is emitted in the direction 663 which may not be perfectly parallel to the observation direction but it may travel a distance where the scattered or emitted light hits the optical sensors 662. Thereby, the optical sensor obtains light that originates from a very small region of the target, allowing for imaging this region of the target.

By moving the light sheet and the target relative to each other (for example by moving the optical system or by moving the target), it is possible to move the light sheet through the whole target, thereby allowing for obtaining information on any section of the target with the optical sensor 662.

By aggregating this information, it is possible to perform a 3-D imaging and obtain a three-dimensional image of the target 661. Additionally, it becomes possible to specifically analyze the behavior of only portions of the target, for example the behavior of specific processes within cells by not moving the light sheet relative to the target but by monitoring only a very specific portion of the target.

Additionally, the invention improves the quality of the scattering images due to the temporal incoherence of the source that avoids speckles. However, although the invention is described to be specifically applicable to a light sheet fluorescence microscope by using an optical device with an optical system as described in FIG. 4 and a light source device as described with respect to FIGS. 1 to 3, the invention is not limited thereto. Additionally, other applications may be thought of.

For example, the light source device according to the invention may be used in the context of total internal reflection illumination. The concept of the total internal reflection illumination is known from an article by Alexrod et al in the Journal of Cell Biology, April 1981, 89 (1) 141 to 145. Additional applications may be the high low illumination as described by Tokunaga et al in Nature Methods volume 5, pages 159 to 161, 2008 and incorporated herein by reference.

Also other applications are possible due to the fact that the one-dimensional pattern can have any shape. As explained above, the shape may, for example, be the shape of the contour of a triangle or a contour of a rectangle or it may be any irregular line like a semicircle, a semi elliptical shape, a hyperbolic shape or any other shape as is deemed suitable.

Other configurations like orienting the system 550 in an orthogonal direction allows for generating a sequence of light sheets distributed along the observation direction S.

Additionally, with this concept, new illuminating systems can be provided.

If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

The invention claimed is:

1. A light source device comprising a light source and an optical component, wherein the optical component comprises a receiving section for receiving light from the light source and an emitting section for emitting light, wherein the light source is a non-coherent light source and is adapted to emit light from a two-dimensional region and wherein the optical component is adapted to guide the light from the receiving section to the emitting section such that the light is emitted in a one dimensional pattern at the emitting section;

wherein the optical component comprises a plurality of multimode fibers for guiding light, wherein, within a tapered section positioned between the receiving section and the emitting section, the plurality of multimode fibers are fused together with one another and tapered at the receiving section into a single fiber comprising a single multimode core and separated at the emitting section into the plurality of multimode fibers, and wherein, within the tapered section, the single fiber comprising the single multimode core at the receiving section smoothly transitions to a bundle of fibers comprising the plurality of multimode fibers at the emitting section, the smooth transition achieved by melting a portion of the bundle of fibers together at one point and increasing a length in a specific portion such that a diameter of the tapered section is reduced from the bundle of fibers to the single fiber comprising the multimode core; or wherein the optical component comprises a plurality of single mode fibers for guiding light, wherein, within a tapered section positioned between the receiving section and the emitting section, the plurality of single mode fibers are fused together with one another and tapered at the receiving section into a single fiber comprising a single multimode core and separated at the emitting section into the plurality of single mode fibers, and wherein, within the tapered section, the single fiber comprising the single multimode core at the receiving section smoothly transitions to a bundle of fibers comprising the plurality of single mode fibers at the emitting section, the smooth transition achieved by melting a portion of the bundle of fibers together at one point and increasing a length in a specific portion such that a diameter of the tapered section is reduced from the bundle of fibers to the single fiber comprising the multimode core.

2. The light source device according to claim 1, wherein the light source is an LED or another extended light source, the extended light source being a spatially non-coherent light source.

3. The light source of claim 2, wherein the other extended light source is an arc lamp.

4. The light source device according to claim 1, wherein the emitting section is shaped to emit light in the form of at least one of a straight line, a contour of a circle, a contour of a triangle, a contour of a rectangle, and an irregular line.

5. The light source device according to claim 1, wherein the plurality of fibers are single-mode fibers.

6. The light source device according to claim 1, wherein the plurality of fibers are multi-mode fibers.

7. The light source device according claim 1, wherein the tapered section fulfills an adiabatic expansion, wherein the tapered section is elongated to the adiabatic condition without changing the form of the cross-section.

8. The light source device according to claim 1, wherein a first imaging system is arranged between the light source and the receiving section for imaging light emitted from the light source to the receiving section.

9. The light source device according to claim 1, wherein the light source comprises a plurality of LEDs and wherein the light source device further comprises a second imaging system for imaging light emitted from the LEDs into the receiving section.

10. The light source device according to claim 1, wherein the optical component comprises a photonic lantern.

11. An optical device comprising a light source device and an optical component, wherein the optical component comprises a receiving section for receiving light from the light source and an emitting section for emitting light, wherein the light source is a non-coherent light source and is adapted to emit light from a two-dimensional region and wherein the optical component is adapted to guide the light from the receiving section to the emitting section such that the light is emitted in a one dimensional pattern at the emitting section and an optical system arranged in a propagation direction of the light after the emitting section, wherein the optical system is adapted to collimate and/or focus emitted light;
   wherein the optical component comprises a plurality of multimode fibers for guiding light, wherein, within a tapered section positioned between the receiving section and the emitting section, the plurality of multimode fibers are fused together with one another and tapered at the receiving section into a single fiber comprising a single multimode core and separated at the emitting section into the plurality of multimode fibers, and wherein, within the tapered section, the single fiber comprising the single multimode core at the receiving section smoothly transitions to a bundle of fibers comprising the plurality of multimode fibers at the emitting section, the smooth transition achieved by melting a portion of the bundle of fibers together at one point and increasing a length in a specific portion such that a diameter of the tapered section is reduced from the bundle of fibers to the single fiber comprising the multimode core; or
   wherein the optical component comprises a plurality of single mode fibers for guiding light, wherein, within a tapered section positioned between the receiving section and the emitting section, the plurality of single mode fibers are fused together with one another and tapered at the receiving section into a single fiber comprising a single multimode core and separated at the emitting section into the plurality of single mode fibers, and wherein, within the tapered section, the single fiber comprising the single multimode core at the receiving section smoothly transitions to a bundle of fibers comprising the plurality of single mode fibers at the emitting section, the smooth transition achieved by melting a portion of the bundle of fibers together at one point and increasing a length in a specific portion such that a diameter of the tapered section is reduced from the bundle of fibers to the single fiber comprising the multimode core.

12. The optical device according to claim 11, wherein the optical system comprises a cylindrical lens that is adapted to create a light sheet or a set of parallel light sheets from emitted light.

13. A light sheet microscope comprising an optical sensor having an observation direction, an optical device comprising an optical component, and an optical system arranged in a propagation direction of light after an emitting section,
   wherein the optical system comprises a cylindrical lens that is adapted to create a light sheet or a set of parallel light sheets from emitted light,
   wherein the optical component comprises a receiving section for receiving light from a light source and the emitting section for emitting light, wherein the light source is a non-coherent light source and is adapted to emit light from a two-dimensional region and wherein the optical component is adapted to guide the light from the receiving section to the emitting section such that the light is emitted in a one dimensional pattern at the emitting section,
   wherein the optical sensor and the optical device are arranged relative to each other such that the observation direction is in a plane perpendicular to the light sheet and this plane contains the propagation direction of the light sheet, and an angle between the propagation direction and the observation direction is greater than zero, and
   wherein the optical component comprises a plurality of multimode fibers or a plurality of single mode fibers for guiding light, wherein, within a tapered section positioned between the receiving section and the emitting section, the plurality of multimode fibers or the plurality of single mode fibers are fused together with one another and tapered at the receiving section into a single fiber comprising a single multimode core and separated at the emitting section into the plurality of multimode fibers or the plurality of single mode fibers, and wherein, within the tapered section, the single fiber comprising the single multimode core at the receiving section smoothly transitions to a bundle of fibers comprising the plurality of single mode fibers or the plurality of single mode fibers at the emitting section, the smooth transition achieved by melting a portion of the bundle of fibers together at one point and increasing a length in a specific portion such that a diameter of the tapered section is reduced from the bundle of fibers to the single fiber comprising the multimode core.

14. The optical system of claim 13, wherein the optical system comprises one or more mirrors, one or more lenses, or any other optical component suitable for collimating/focusing or manipulating the light emitted.

* * * * *